(12) United States Patent
Wessels

(10) Patent No.: US 8,196,867 B1
(45) Date of Patent: Jun. 12, 2012

(54) SPACE ELEVATOR PROPULSION SYSTEM USING MECHANICAL WAVES

(76) Inventor: Mark Wessels, Lewisville, TX (US)

( * ) Notice: Subject to any disclaimer, the term of this patent is extended or adjusted under 35 U.S.C. 154(b) by 219 days.

(21) Appl. No.: 12/822,993

(22) Filed: Jun. 24, 2010

(51) Int. Cl.
*B64G 1/00* (2006.01)
*B64G 1/42* (2006.01)
*B64G 99/00* (2009.01)

(52) U.S. Cl. .................................. 244/158.2

(58) Field of Classification Search ............ 244/158.2, 244/158.1, 173.2, 60, 1 TD; 472/10; 446/33, 446/31; 187/250, 289, 406–408, 414
See application file for complete search history.

(56) References Cited

U.S. PATENT DOCUMENTS

| | | | | |
|---|---|---|---|---|
| 6,981,674 B1 * | 1/2006 | Dempsey | .................. | 244/158.2 |
| 2011/0005869 A1 * | 1/2011 | Hinton | .......................... | 187/414 |

OTHER PUBLICATIONS

Bradley, E., "The Space Elevator NIAC Phase II Final Report" Mar. 1, 2003.*
Palmer, J., "Getting into space by broomstick" Jan. 5, 2009. BBC News.*

* cited by examiner

*Primary Examiner* — Tien Dinh
*Assistant Examiner* — Richard R Green
(74) *Attorney, Agent, or Firm* — Michael Diaz

(57) ABSTRACT

A system and method for propelling a carriage on a cable of a space elevator. The space elevator system includes a cable anchored to a terrestrial body on a first end and a counterweight on an opposing second end and a carriage riding along the cable. The system also includes an oscillator for generating a mechanical wave upon the cable. Mechanical energy created by the generated mechanical wave is converted into power to propel the carriage upon the cable. The oscillator may include a pair of opposing pistons contacting the cable on opposite sides of the cable or an electromagnetic driver powered by electromagnets located on opposite sides of the cable.

19 Claims, 11 Drawing Sheets

SPACE ELEVATOR PROPULSION SYSTEM USING MECHANICAL WAVES

BACKGROUND OF THE INVENTION

1. Field of the Invention

This invention relates to propulsion systems. Specifically, and not by way of limitation, the present invention relates to a system and method of propelling a space elevator using mechanical waves.

2. Description of the Related Art

There have been many benefits which we have enjoyed because of space travel. For example, communication systems involving telecommunications and broadcasting rely on a series of orbiting satellites. Satellites are also used for surveying and surveillance of various regions of the world. There is currently an international space station housing a few astronauts and cosmonauts for extended periods of time. However, a prime obstacle to further utilization of space orbiting systems is the cost of launching objects and humans into space. Costly rockets are needed to propel vehicles into space. Because of these costs, these space based orbiting systems are used in manner less than desired.

One alternative to launching rockets into space is the utilization of a space elevator. A space elevator has been proposed which can transport material from a celestial body's surface (i.e., the Earth) into space. Many variants have been proposed, all of which involve traveling along a fixed structure, instead of using rocket powered space launch. The concept most often refers to a structure that reaches from the surface of the Earth on or near the Equator to geostationary orbit (GSO) and a counter-mass beyond.

FIG. 1 is a simplified side view of a space elevator. A cable 10 is affixed to the surface of the Earth 12. The cable extends out into space and ends in a counterweight 14 orbiting the Earth. Inertia ensures that the cable remains stretched taut, countering the gravitational pull on the lower sections, thus allowing an elevator system 16 to remain in geostationary orbit. A carriage 18 carrying passengers and/or cargo would run upon the cable to reach orbit. Once beyond the gravitational midpoint, the carriage would be accelerated further by the planet's rotation.

The use of a space elevator shows great promise. However, there are various technological obstacles. A primary obstacle is finding a mechanism to propel the carriage to space. The mechanical lifting power, P, is equal to the weight of the carriage, mg, multiplied by the vertical velocity, v, of travel. Therefore: P=mgv. A reasonable value for v is 33 meters/sec. Thus, P=(10 000 kg)(9.8 meters/sec/sec)(33 meters/sec)=3.234 million Watts. Therefore, in order to propel a 10,000 kilogram carriage into space, over 3 million Watts of power need to be transmitted to the carriage. A primary proposal for propelling the carriage on the cable is a laser/optical conversion system. The laser/optical system depends on having clear weather, which does not always occur and suffers from the problem of conversion efficiency. Proponents of the laser/optical system expect to solve the weather problem by anchoring the space elevator cable on a ship at sea, which can then be maneuvered over several hundred miles. However, for various reasons, it would be far more beneficial to build a space elevator that is anchored to land.

Thus, it would be advantageous to have a land based propulsion system which efficiently propels a carriage up into space. It is an object of the present invention to provide such a system.

SUMMARY OF THE INVENTION

The present invention is a system and method for propelling a carriage on a cable of a space elevator. In one aspect, the present invention is directed to a space elevator system. The space elevator system includes a cable anchored to a terrestrial body on a first end and a counterweight on an opposing second end and a carriage riding along the cable. The system also includes an oscillator for generating a mechanical wave upon the cable. Mechanical energy created by the generated mechanical wave is converted into power to propel the carriage upon the cable.

In another aspect, the present invention is directed to a system for propelling a carriage on a cable of a space elevator. The system includes an oscillator for generating a mechanical wave upon the cable. The mechanical wave generates mechanical energy which is converted into power to propel the carriage upon the cable.

In still another aspect, the present invention is directed to a method of propelling a carriage on a cable of a space elevator. The method begins by generating a mechanical wave upon the cable. Mechanical energy is then created from the generated wave and converted into energy for propelling the carriage upon the space elevator.

DESCRIPTION OF THE INVENTION

Figure 1:
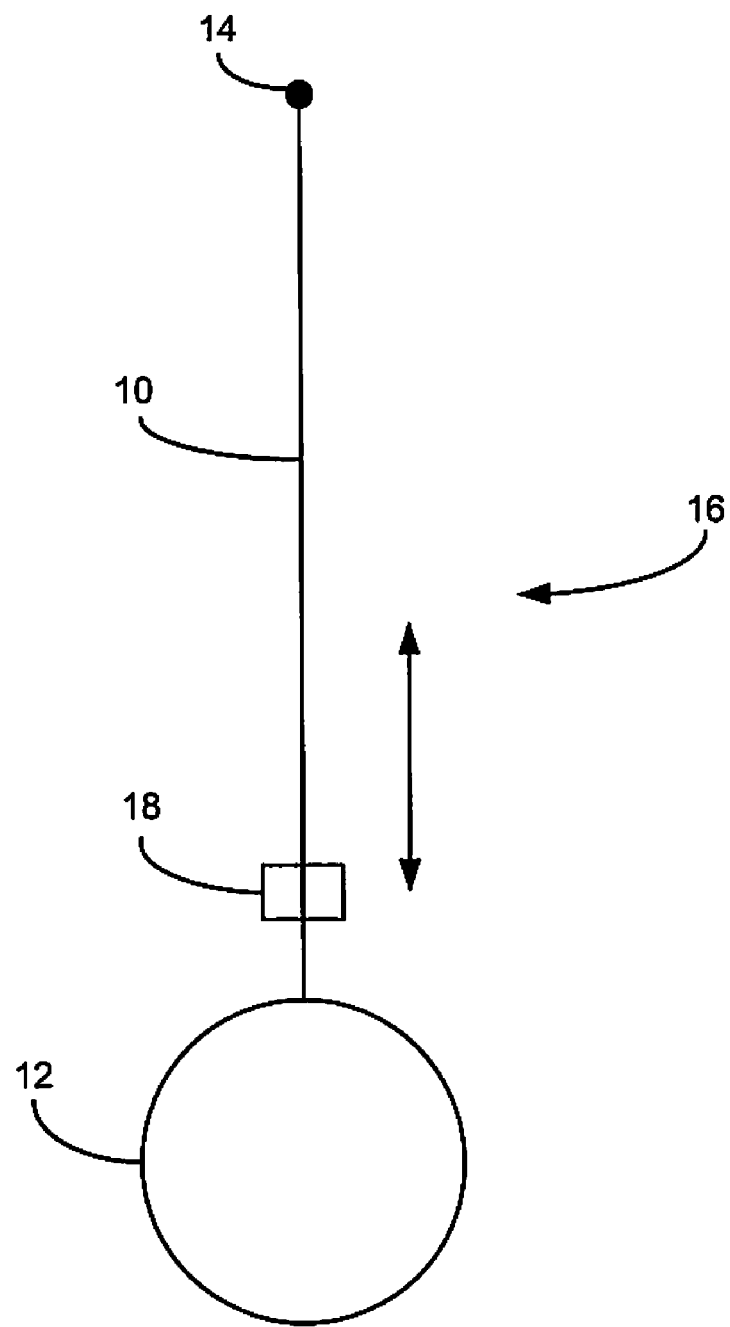
FIG. 1 (prior art) is a simplified side view of a space elevator.

The present invention is a system and method for propelling a carriage of a space elevator into space using mechanical waves. In order to harness the energy of mechanical waves upon a cable, several parameters must be determined. Power in a transverse wave is illustrated in the following equations:

$$Y(x, t) = A\sin(kt - \omega t - \phi)$$
$$= A\sin[k(x - vt) - \phi]$$

Where:
y is the instantaneous amplitude (a function of time and position);
A is the maximum amplitude;

k is the wavenumber (2π/wavelength);
ω is the angular frequency; and
φ is an arbitrary phase.

$$\text{Power} = \text{force} \times \text{velocity}$$
$$= \tau \cdot \left|\frac{dy}{dx}\right| \cdot \left|\frac{dy}{dt}\right|, \text{ where}$$

T is the tension in the cable, $$\frac{dy}{dx}$$

is the derivative with respect to position 'x', which gives the slope (for small amplitudes), $$\frac{dy}{dt}$$

is the derivative with respect to time 't' (also the transverse velocity), and Furthermore:

$$y(x, t) = A\sin(kx - \omega t - \phi)$$
$$\frac{dy}{dx} = kA\cos(kx - \omega t - \phi)$$
$$\frac{dy}{dt} = -wA\cos(kx - \omega t - \phi)$$

Together, $P = -\omega k A^2 T \cos^2(kx - \omega t - \phi)$
Averaged over one cycle, $<\cos^2(u)> = \frac{1}{2}$
Therefore:

$$|P| \text{ or } P_{avg} = \frac{1}{2}\omega k T A^2$$

In addition, $$\frac{w}{k} = v,$$

the wave speed, so $$k = \frac{w}{v}$$

Which results in:

$$P_{avg} = 1/2 \, \tau \, \frac{w^2 A^2}{v}$$

Thus, the values for T, ω, and A must be found to yield the required amount of power necessary to propel the carriage.

Cable tension, T, has a value of 200,000 Newtons (corresponding to the weight of some 20,000 kg) at the anchor point. Near the surface of the Earth, the cable tension does not deviate much from this value. However, at greater distances, the tension increases dramatically.

Wave speed along the cable should remain constant. This can be illustrated in the following manner:

$$\text{Speed } V = \sqrt{\frac{\tau/\sigma}{l/\sigma}}$$

The stress, T/σ, is constant.

The density, l/σ, is a function of the molecular structure of the cable material and where l is the mass per unit length of the cable. Most generally, density should be constant over the length of the cable. σ is the cross-sectional area of the cable. Thus, wave speed V is constant. In addition, the wave speed itself is constant over the entire cable.

Current designs for the space elevator set l at just 15 grams per meter. Thus, the total mass of the cable would be approximately 1,500,000 kilograms for an entire length of the cable of 100,000 kilometers. The wave speed is then:

$$V = \sqrt{\frac{200,000 \text{ N}}{0.015 \text{ kg per meter}}} = 3650 \text{ meters per second.}$$

Thus, the wave propagates up the cable at hypersonic speeds. A nominal wave amplitude of 60 centimeters is chosen. The frequency of the wave oscillation, ω is derived from:

$$P_{avg} = 1/2 \, \tau \, \frac{w^2 A^2}{v}$$

Solving for ω yields:

$$\omega = \sqrt{\frac{2 P_{avg} V}{\tau A^2}}$$

$$\text{Thus, } \omega = \sqrt{\frac{2(3.3 \times 10^6)(3650 \text{ meters per sec})}{(2 \times 10^5)(0.60)^2}}$$

which equals 578 radians per second.

$$f = \frac{w}{2\Pi} = 92$$

cycles per second which yields 5520 revolutions per minute T (period)=1/92 second $$\text{Wavelength, } \lambda = \text{speed} \times \text{period} = (3650 \text{ meter per second})(1/92 \text{sec})$$
$$= 39.6 \text{ meters}$$

The maximum transverse force (MTF) delivered by the wave is:

$$\tau \left|\frac{dy}{dx}\right| = \tau k A, \text{ where } k = \frac{2\Pi}{\text{wavelength}(\lambda)}$$

$$k = \frac{2\Pi}{39.6} = 0.159 \text{ rad/meter}$$

where k is the wavenumber (2π/wavelength).

Therefore, MTF equals approximately 2 metric tons.

Figure 2:
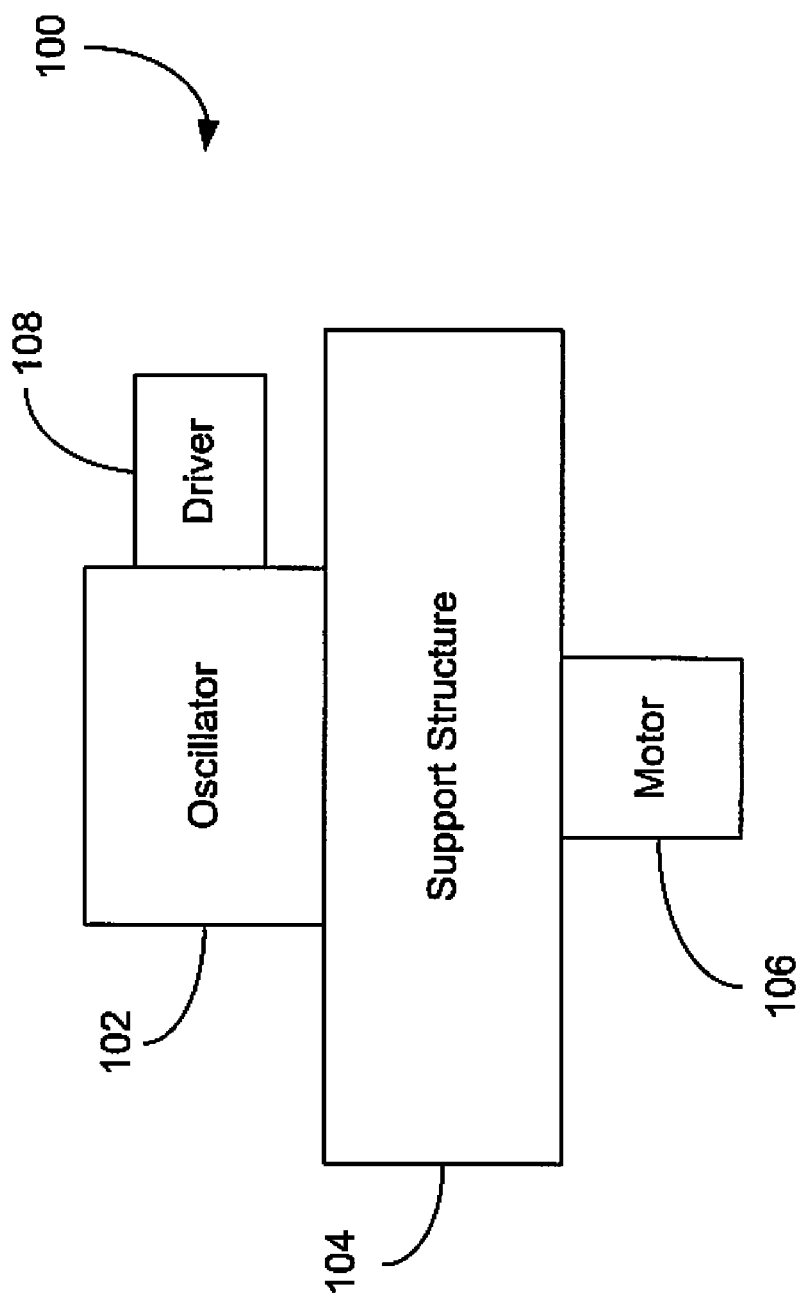
FIG. 2 is a simplified block diagram of the components of a space elevator propulsion system in the preferred embodiment of the present invention.
Figure 3:
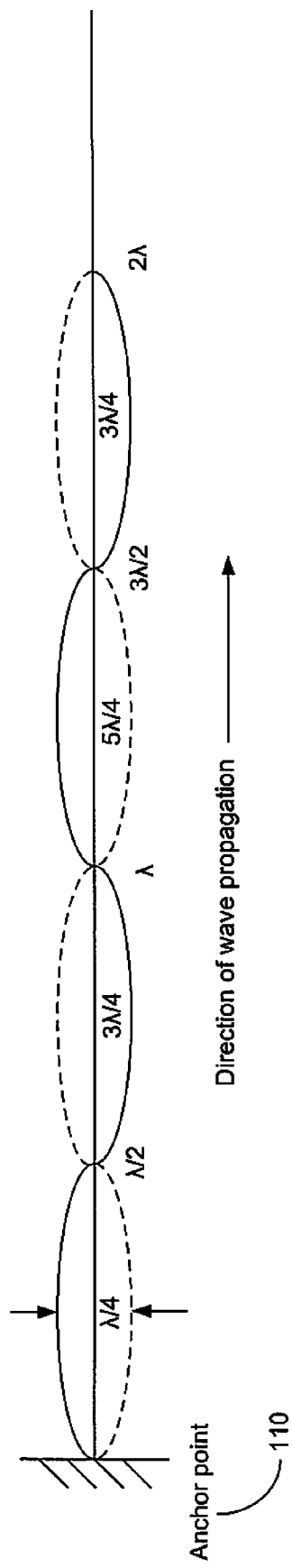
FIG. 3 is a side view of the oscillator cycle action of the propulsion system of FIG. 2.

FIG. 2 is a simplified block diagram of the components of a space elevator propulsion system 100 in the preferred embodiment of the present invention. The propulsion system includes a mechanical oscillator 102 for applying transverse forces to the faces of the cable 10. Preferably, the cable is a ribbon having two faces. The oscillator includes a support structure 104, a motor 106, and a driver 108. The forces to the cable are applied in an alternating fashion. During the first half of the cycle, force is applied to one face of the cable. During the second half of the cycle, the force on the front face is diminished while force on the back face of the cable is applied. This cycle is then repeated. To achieve the greatest efficiency, the driver 108 is positioned one-quarter wavelength (λ/4) above an anchor point 110 where the oscillator is affixed upon the ground. FIG. 3 is a side view of the oscillator cycle action. Thus, a resonance occurs between the driver and the cable, thereby allowing the maximum transference of mechanical power.

Figure 4:
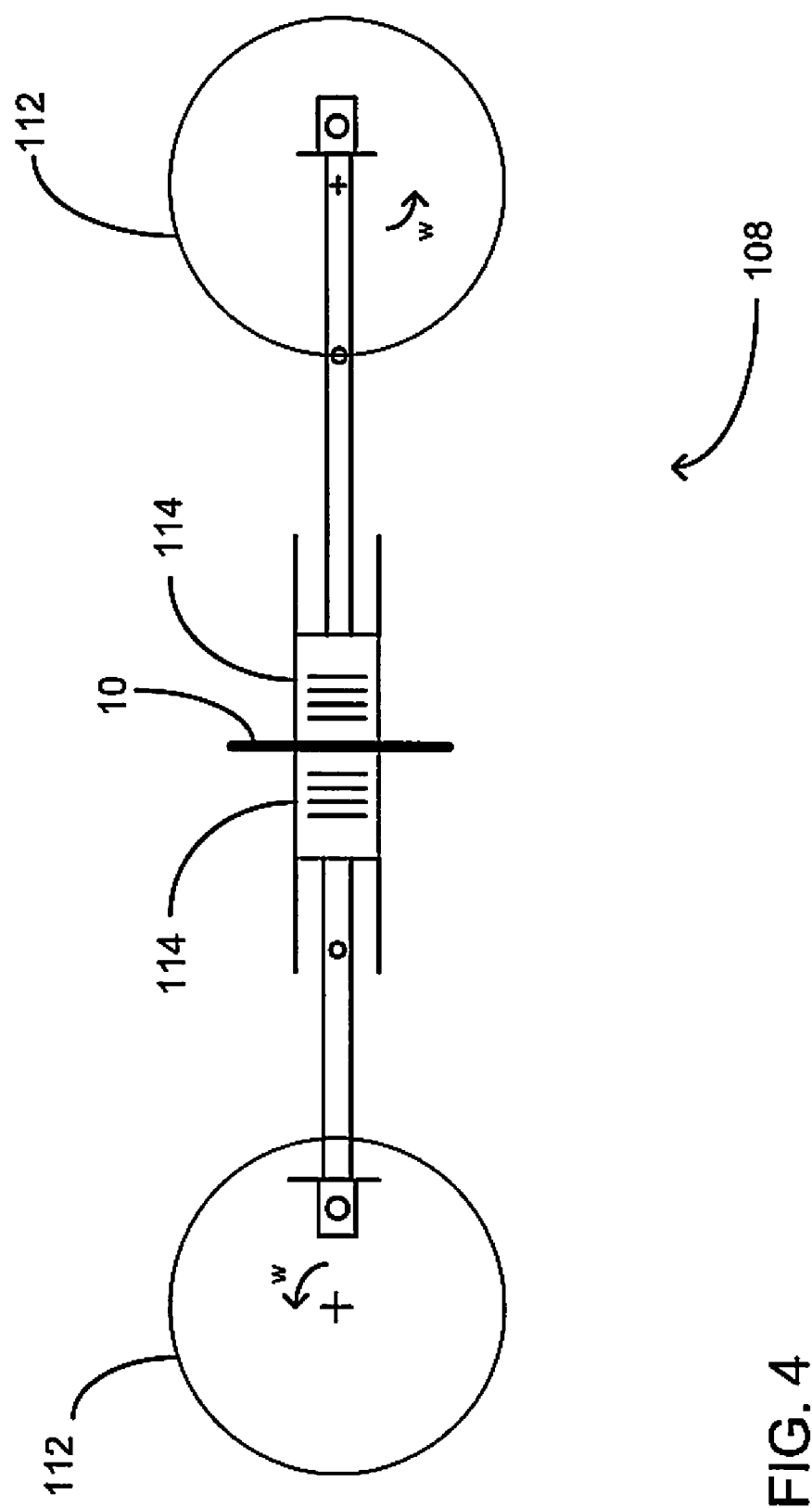
FIG. 4 is a top view of a driver of the propulsion system of FIG. 2.

FIG. 4 is a top view of the driver 108 in one embodiment of the present invention. The driver includes two rotating discs (flywheels) 112. Each disc drives a linear piston 114 against the elevator cable 10. In the preferred embodiment of the present invention, the pistons are set 180 degrees out-of-phase so that as one piston reaches its maximum advancement, the other piston reaches its maximum retreat.

Figure 5:
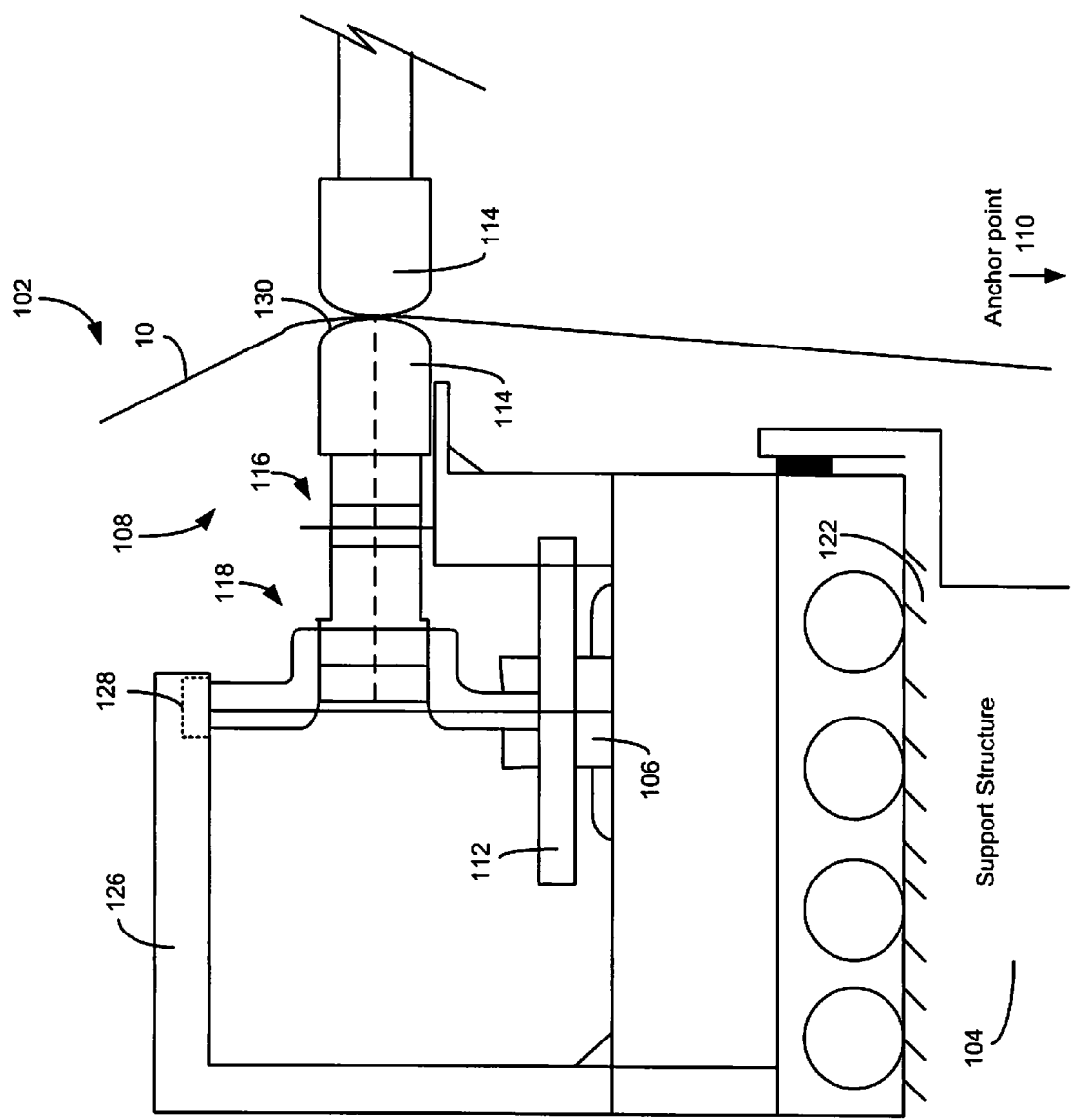
FIG. 5 is a partial side view of the oscillator and driver in the preferred embodiment of the present invention.

FIG. 5 is a partial side view of the oscillator 102 and driver 108 in the preferred embodiment of the present invention. The driver includes pistons 114. Each piston 114 is preferably slid in a cylinder 116 or magnetically levitated by a plurality of permanent magnets. Piston arms may be connected to crankshafts 118, which are, in turn, attached to the discs (flywheels) 112. The discs act as transmissions, smoothing the transmittance of mechanical power. The discs themselves are driven by powerful electric motors 106. Preferably, each motor would supply half the required power (i.e., 1⅔ million watts or nearly 2200 horsepower. Each half of the system is mounted on rails 122 on the support structure 104 to allow retraction for maintenance. The crankshaft may be supported by an upper arm 126 with a plurality of magnetic bearings 128. The piston includes a curved surface 130 which contacts the cable 10. The cable 10 is preferably attached at the anchor point 110 one-quarter wavelength (approximately 10 meters) below the oscillator. FIG. 5 only shows the left side of the oscillator. The oscillator also includes a right opposing side of the oscillator which corresponds to the components of the left side.

Figure 9:
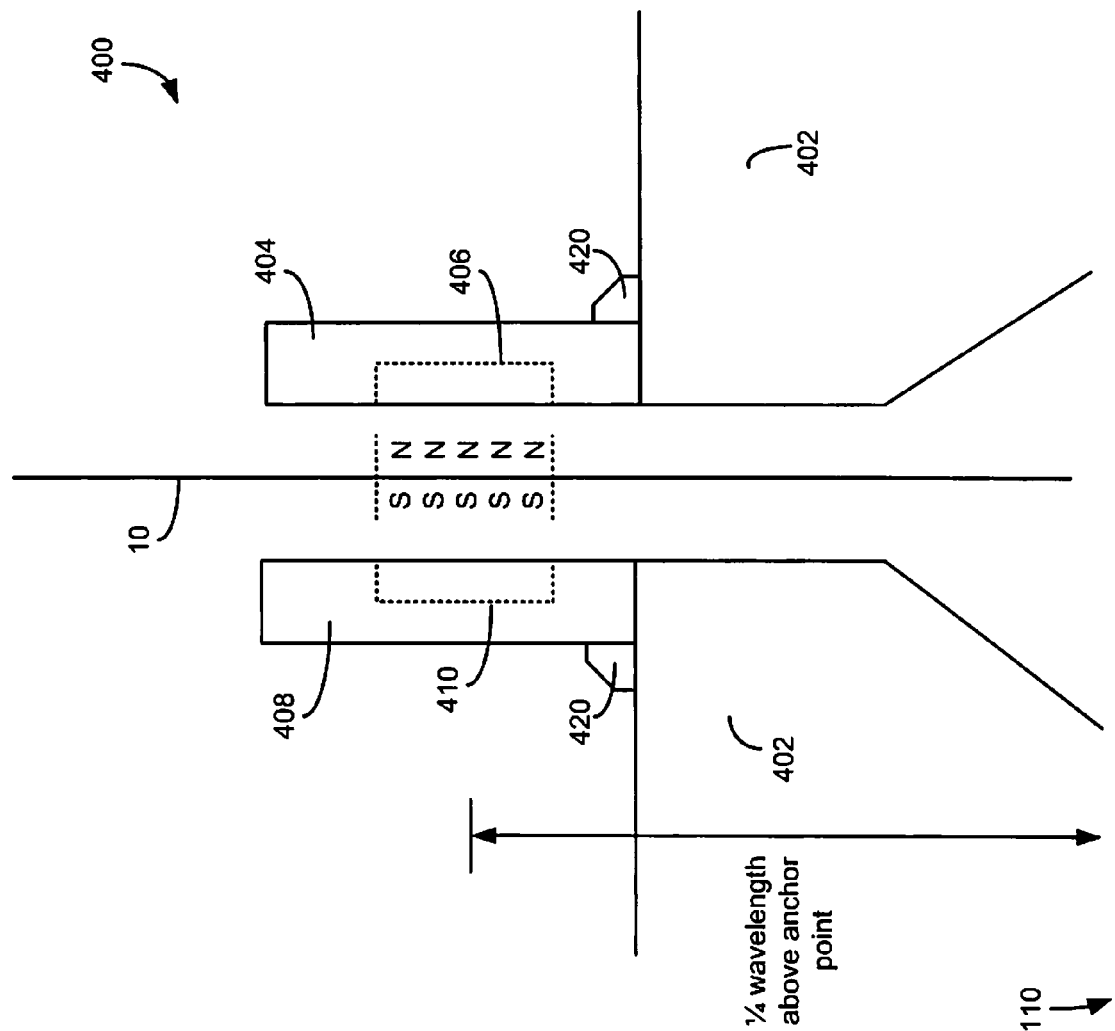
FIG. 9 is a front view of an electromagnetic driver in one embodiment of the present invention.
Figure 10:
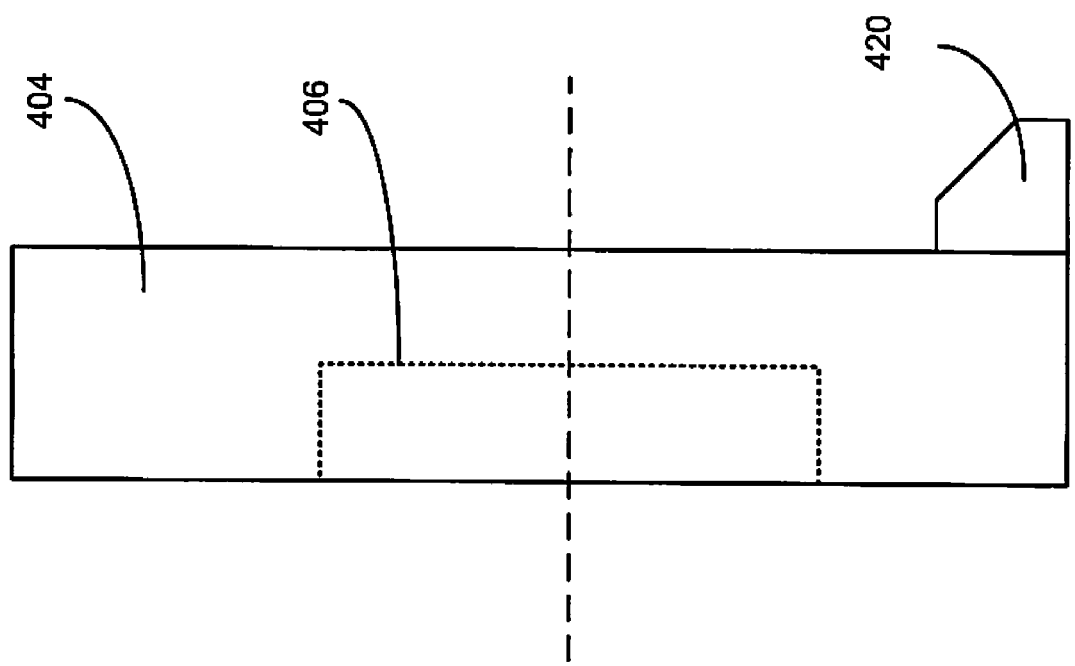
FIG. 10 is a side view of the pole stand for use with the electromagnetic driver of FIG. 9.
Figure 11:
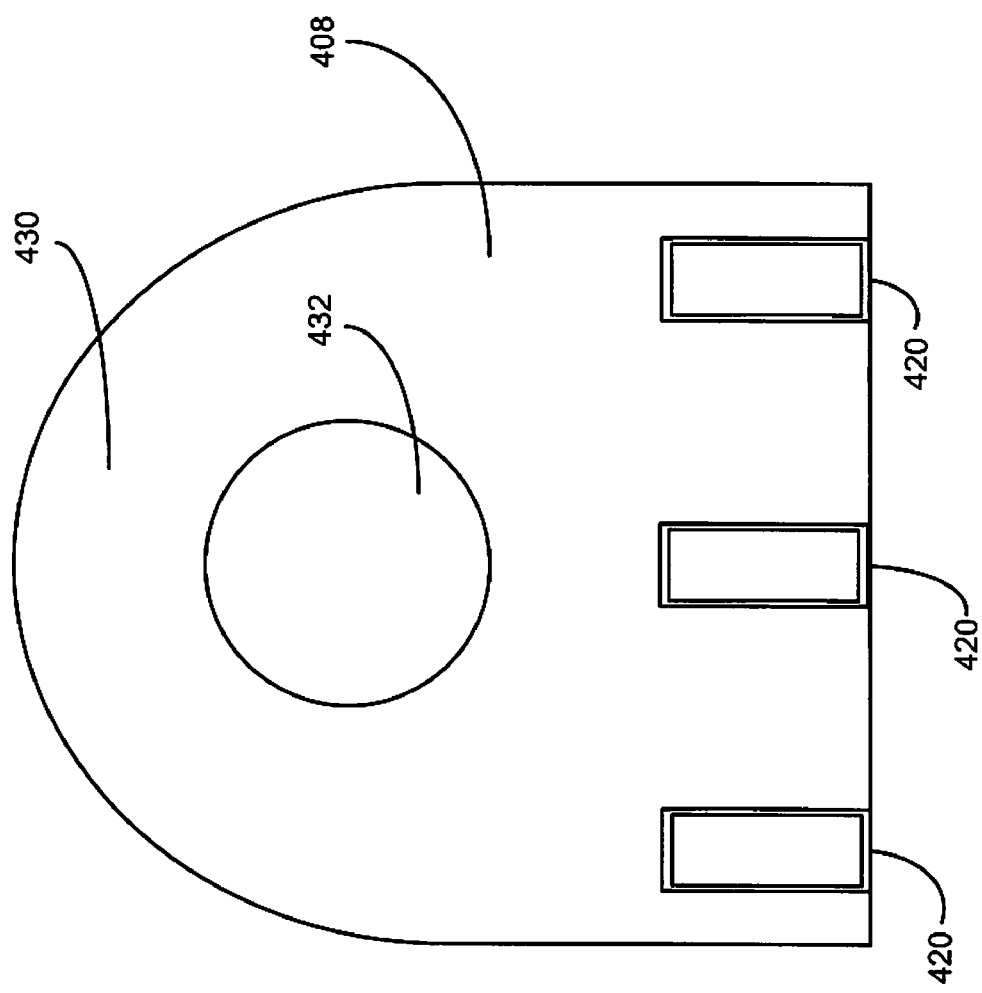
FIG. 11 is a back view of the pole stand of FIG. 10.

In an alternate embodiment of the present invention, the present invention may utilize an electromagnetic driver. Powerful electromagnets (each capable of lifting a large automobile) may be positioned on either side of the cable (ribbon) face. Attached to the cable is preferably a ferromagnetic material. This material is attracted by the strong forces generated by each magnet. The driving currents alternate between the two sides. The ferromagnetic material allows flexion of the cable at this point. Advancements in material technology may allow the cable itself to incorporate magnetic dopants in this region, thereby circumventing the need to physically attach external components to the cable. Very precise control of both the frequency and amplitude of the driving forces is possible with this alternate embodiment of the present invention. In this embodiment, there are no moving parts. FIG. 9 is a front view of an electromagnetic driver 400 in one embodiment of the present invention. The electromagnetic driver may be positioned on a platform 402 and drives the cable 10. The electromagnetic driver may include a pole stand 404 having North (N) magnetic pole material 406 and a pole stand 408 having South (S) magnetic pole material 410. The S and N magnetic pole material are preferably located at ¼ wavelength above the anchor point 110. FIG. 10 is a side view of the pole stand 404. The pole stand may include support braces 420. FIG. 11 is a back view of the pole stand 404. The pole stand includes a support ring 430 supporting an electro-magnetic pole face 432.

In order to transfer the several million watts of mechanical power to the vehicle, the equivalent of an automobile transmission is needed. The transmission must extract the mechanical power from the cable and then convert the power to a form that is able to pull the carriage upward. In the preferred embodiment of the present invention, the transmission also works in reverse. A descending elevator carriage transmits energy down the cable to the anchor station, thereby recovering much of the energy required to raise the carriage.

Preferably, the transmission must avoid the production of reflections of the waves. Reflected waves may disrupt the power transmission process and possibly destroy or damage the driver. The physics of wave reflections is completely analogous to that of reflected electromagnetic power in a transmission line (i.e., the "standing wave ratio" (SWR) of radio parlance). In this way, the transmission may be considered to be a mechanical impedance matcher.

A primary design consideration for the transmission is the frequency of the waves. To absorb the wave power in the most efficient manner, the transmission must be "tuned" to the frequency of the wave propagation, ω.

Figure 6:
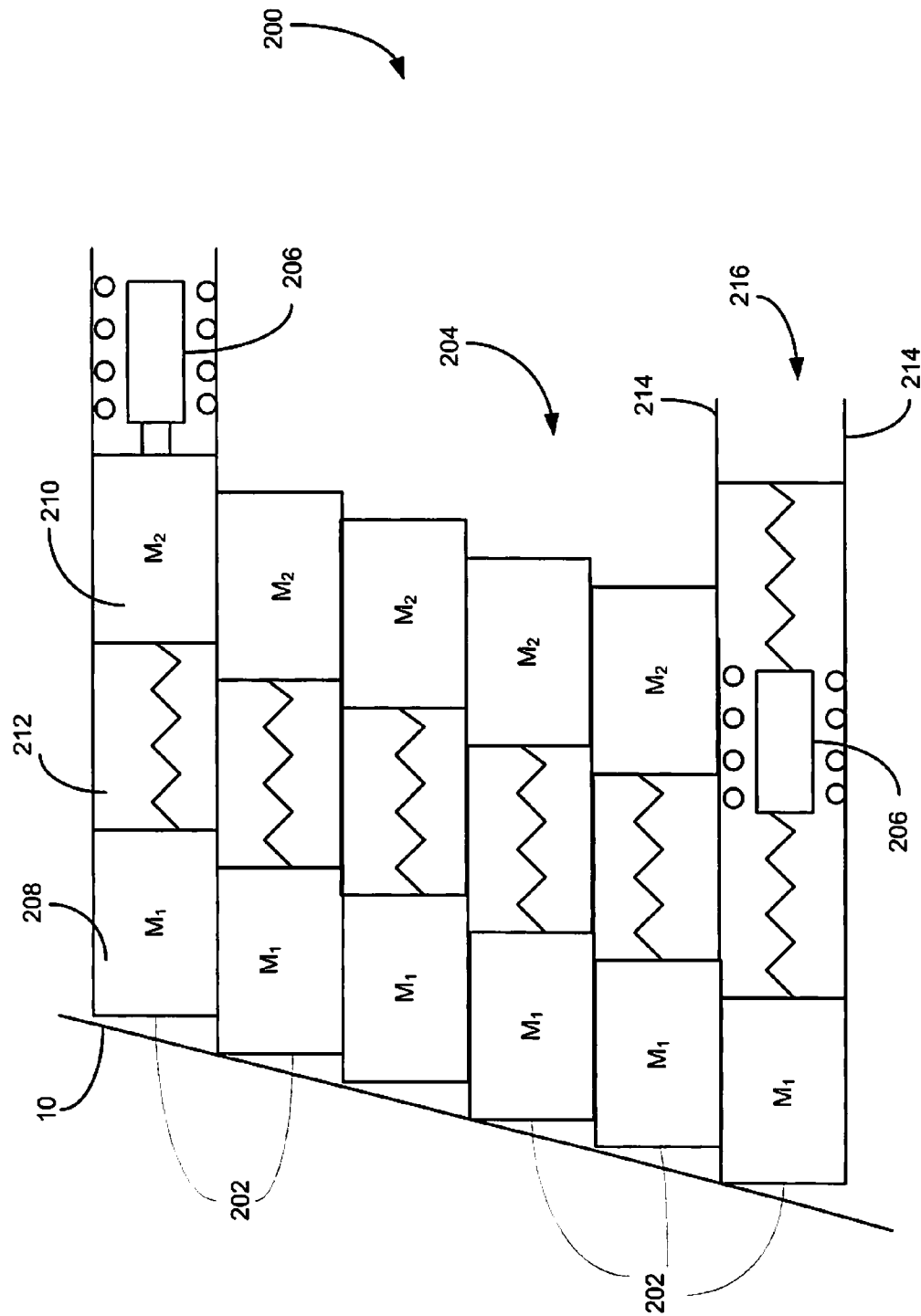
FIG. 6 illustrates a side view of a transmission system for transferring the energy created by the mechanical waves induced by the oscillator in one embodiment of the present invention.

FIG. 6 illustrates a side view of a transmission system 200 for transferring the energy created by the mechanical waves induced by the oscillator in one embodiment of the present invention. The transmission system 200 includes a plurality of linearly aligned pistons 202 coupled to a carefully tuned mass-spring system 204. Each piston drives its own electric generator 206. The mass-spring system for each piston includes a first mass 208 which is in direct contact with the cable 10 and a second mass, 210 which is a permanent magnet placed within a coil 212. The produced electrical currents drive an electric motor or plurality of motors (not shown) attached to the carriage 18, thereby drawing the carriage up the cable. In the preferred embodiment of the present invention, magnetic rails 214 are used to guide the pistons within a cylinder 216. The generator 206 may be affixed to one side of the mass 210 or between the mass 208 and mass 210. The transmission system is the "engine" driving the carriage up the cable 10.

Figure 7:
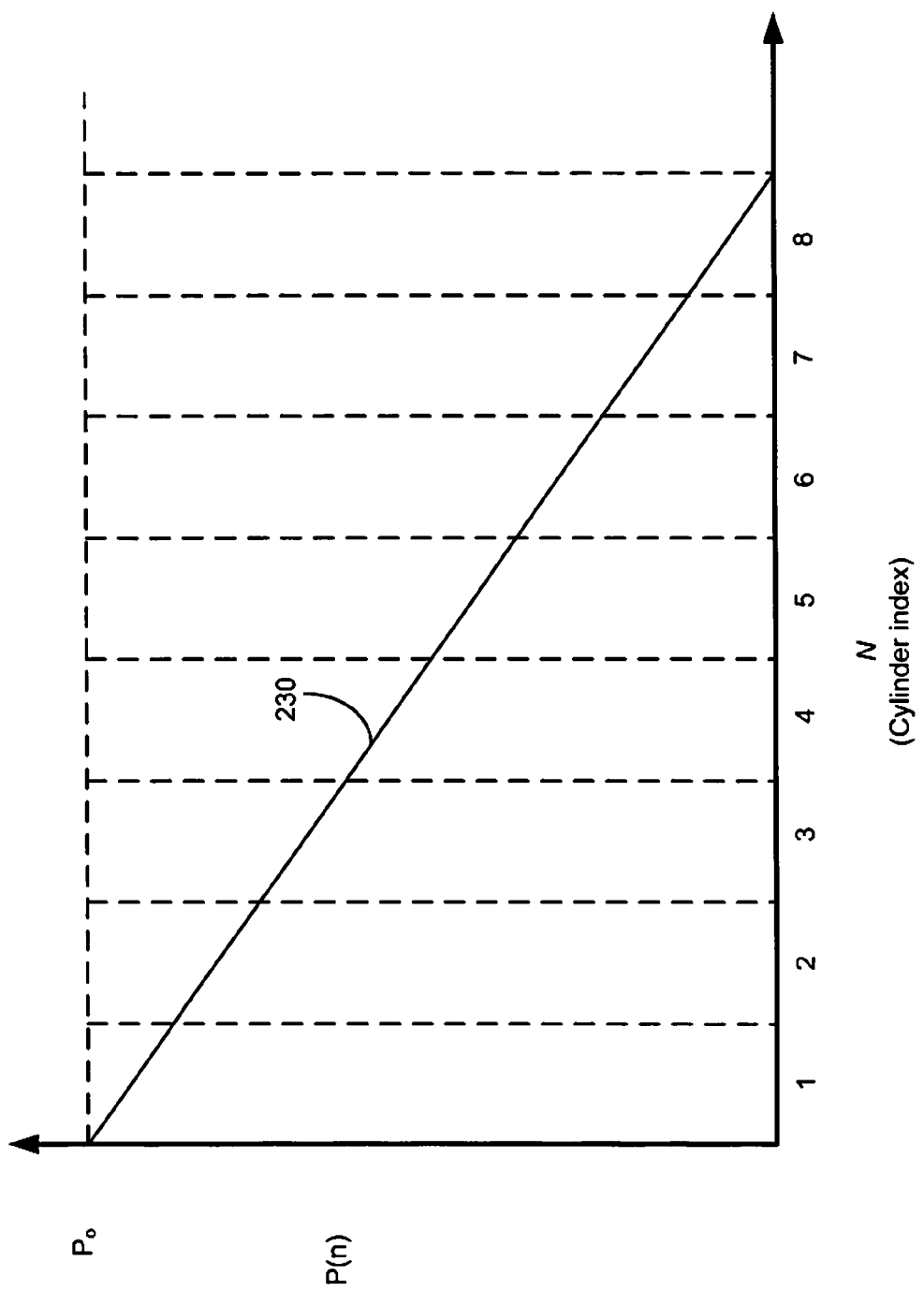
FIG. 7 is a graphical illustration of a power profile for the cylinder.

FIG. 7 is a graphical illustration of a power profile for the cylinder 216. The graph illustrates power versus a cylinder index, n, the total number of cylinders. Preferably, it is desirable to distribute the extracted power evenly over all cylinders. The power profile is linear as depicted by line 230. The power profile is derived from the following equations:

$$P(n)P_0(1-n/N)$$

where $P_0$ is the total power being sent up the cable and $P(n)$ is the wave power present to cylinder number "n".

$$P(n)=A^2$$

$$0 \leq n \leq N-1$$

$$A(n)=\sqrt{P0(1-n/N)}$$

wherein A(n) is the wave amplitude present to cylinder number The above expression is the desired amplitude profile. Each piston behaves as a two-mass damped harmonic oscillator. The damping enables the absorption of the energy from the cable mechanical wave.

As the altitude increases, the strength of the centrifugal force increases relative to gravity. This centrifugal force is directed outwardly away from the Earth Therefore, the centrifugal force actually assists the carriage as it moves upward. The higher the carriage goes, the weaker gravity becomes and the less the amount of power is needed to raise the carriage. At geosynchronous altitude (approximately 23,000 miles above the Earth), the outward centrifugal force actually balances (counteracts) the force of gravity, thereby resulting in the carriage remaining in an orbit above the same point above the Equator. In one embodiment, an orbiting station attached to the cable (not shown) is likely to be positioned at an altitude lower than that of geosynchronous orbit.

Figure 8:
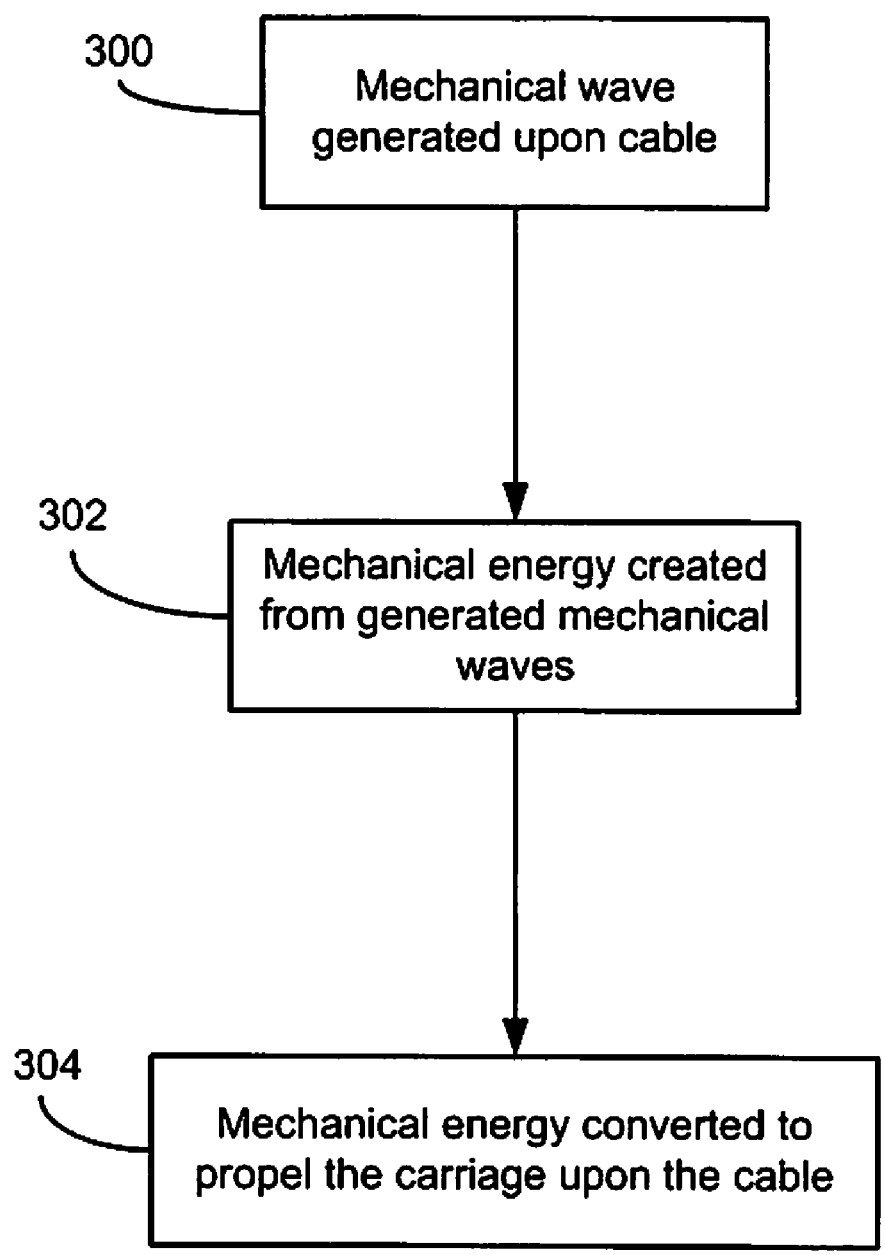
FIG. 8 is a flow chart illustrating the steps of propelling the carriage upon the cable according to the teachings of the present invention.

FIG. 8 is a flow chart illustrating the steps of propelling the carriage 18 upon the cable 10 of the elevator system 16 according to the teachings of the present invention. With reference to FIGS. 1-8, the method will now be explained. In step 300, a mechanical wave is generated on the cable, in one embodiment, the driver 108 drives pistons 114. The curved surface 130 of each piston contacts the cable on opposing sides of the cable. Each piston 114 is preferably slid in the cylinder 116 or magnetically levitated by a plurality of permanent magnets. The piston arms may be connected to crankshafts 118, which are in turn, attached to the discs (flywheels) 112. The discs act as transmissions, smoothing the transmittance of mechanical power. The discs themselves are driven by powerful electric motors 106. Preferably, each motor supplies half the required power (i.e., 1⅔ million watts or nearly 2200 horsepower. The forces to the cable are applied in an alternating fashion. During the first half of the cycle, force is applied to one face of the cable by one of the pistons. During the second half of the cycle, the force on the front face is diminished while force on the back face of the cable is applied by the second opposing piston. This cycle is then repeated. To achieve the greatest efficiency, the driver 108 is positioned one-quarter wavelength ($\lambda/4$) above an anchor point 110 where the oscillator is affixed upon the ground. FIG. 3 is a side view of the oscillator cycle action. Thus, a resonance occurs between the driver and the cable, thereby allowing the maximum transference of mechanical power.

In an alternate embodiment of the present invention, the present invention may utilize an electromagnetic driver. Powerful electromagnets may be positioned on either side of the cable face. Attached to the cable is preferably a ferromagnetic material. This material is attracted by the strong forces generated by each magnet. The driving currents alternate between the two sides. The ferromagnetic material allows flexion of the cable at this point. Advancements in material technology may allow the cable itself to incorporate magnetic dopants in this region, thereby circumventing the need to physically attach external components to the cable. Very precise control of both the frequency and amplitude of the driving forces is necessary with this alternate embodiment of the present invention. In this embodiment, there are no moving parts.

Next, in step 302, mechanical power is created from the generated mechanical wave. In step 304, the mechanical power is transferred into power to propel the carriage 18. In one embodiment, the transmission system 200 is utilized to propel the carriage. The transmission system 200 uses the plurality of linearly aligned pistons 202 coupled to the mass-spring system 204. Each piston drives its own electric generator 206. The mass-spring system for each piston includes a first mass 208 which is in direct contact with the cable 10 and a second mass, 210 which is a permanent magnet placed within a coil 212. The produced electrical currents drive an electric motor or plurality of motors (not shown) attached to the carriage 18, thereby providing power to propel the carriage up the cable. In the preferred embodiment of the present invention, magnetic rails 214 are used to guide the pistons within a cylinder 216. The generator 206 may be affixed to one side of the mass 210 or between the mass 208 and mass 210. The transmission system is the "engine" driving the carriage up the cable 10. The transmission system may also work in reverse. A descending elevator carriage transmits energy down the cable to the anchor station, thereby recovering much of the energy required to raise the carriage.

It should be understood that any mechanism may be used to generate the mechanical waves upon the cable and still remain in the scope of the present invention. Furthermore, any transmission system may be utilized to convert the mechanical energy generated by the mechanical waves into power to propel the carriage upon the cable.

The present invention provides a unique system and method for propelling a carriage upon a cable of a space elevator system. The present invention provides an efficient system and method of generating energy to propel the carriage. Furthermore, unlike current propulsion systems, the present invention may be used in any weather conditions.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A space elevator system, the system comprising:
a cable anchored to a terrestrial body on a first end and a counterweight on an opposing second end;
a carriage riding along the cable;
an oscillator for generating a mechanical wave upon the cable;
means for converting mechanical energy created by the generated mechanical wave into power to propel the carriage upon the cable.

2. The system according to claim 1 wherein the oscillator includes opposing pistons contacting the cable on opposite sides of the cable.

3. The system according to claim 1 wherein the oscillator includes an electromagnetic driver powered by electromagnets located on opposite sides of the cable.

4. The system according to claim 1 wherein the means for converting mechanical energy includes a transmission system having a plurality of pistons and a mass-spring system for converting the mechanical energy.

5. The system according to claim 4 wherein the mass-spring system is a damped harmonic oscillator.

6. A system for propelling a carriage on a cable of a space elevator, the system comprising:
an oscillator for generating a mechanical wave upon the cable of the space elevator; and
means for converting mechanical energy created by the generated mechanical wave into power to propel the carriage upon the cable.

7. The system according to claim 6 wherein the oscillator includes opposing pistons contacting the cable on opposite sides of the cable.

8. The system according to claim 7 wherein the opposing pistons are driven by a driver having at least one rotating disc and a motor.

9. The system according to claim 8 further comprising means for creating a resonance between the driver and the cable.

10. The system according to claim 6 wherein the oscillator includes an electromagnetic driver powered by electromagnets located on opposite sides of the cable.

11. The system according to claim 10 wherein the cable is constructed of a ferromagnetic material.

12. The system according to claim 6 wherein the means for converting mechanical energy includes a transmission system.

13. The system according to claim 12 wherein the transmission system includes a plurality of pistons and a mass-spring system for converting the mechanical energy.

14. The system according to claim 13 wherein the mass-spring system is a damped harmonic oscillator.

15. A method of propelling a carriage on a cable of a space elevator, the method comprising the steps of:

generating a mechanical wave upon the cable;
creating mechanical energy from the generated wave; and
converting the mechanical energy into electrical energy for propelling the carriage upon the space elevator.

16. The method according to claim 15 wherein the step of generating a mechanical wave includes using an oscillator having opposing pistons contacting the cable on opposite sides of the cable to generate the wave.

17. The method according to claim 15 wherein the step of generating a mechanical wave includes using an oscillator having an electromagnetic driver powered by electromagnets located on opposite sides of the cable.

18. The method according to claim 15 wherein the step of converting the mechanical energy include using a transmission system having a plurality of pistons and a mass-spring system for converting the mechanical energy.

19. The method according to claim 18 wherein the mass-spring system is a damped harmonic oscillator.

* * * * *